United States Patent [19]

Fichter et al.

[11] Patent Number: 5,522,663
[45] Date of Patent: Jun. 4, 1996

[54] ARRANGEMENT FOR FUNCTION CHECKING OF A TEMPERATURE SENSOR

[75] Inventors: Manfred Fichter, Königsfeld; Reinhard Merkle, Donaueschingen, both of Germany

[73] Assignee: VDO Kienzle GmbH, Villingen-Schwenningen, Germany

[21] Appl. No.: 199,363

[22] Filed: Feb. 18, 1994

[30] Foreign Application Priority Data

Feb. 20, 1993 [DE] Germany .......................... 43 05 314.9

[51] Int. Cl.[6] .................. G01K 7/16; G01K 1/14
[52] U.S. Cl. ............................ 374/183; 374/208
[58] Field of Search .................... 374/183, 208

[56] References Cited

U.S. PATENT DOCUMENTS

| 4,122,719 | 10/1978 | Carlson et al. | 374/172 |
| 4,210,024 | 7/1980 | Ishiwatari et al. | 374/183 |
| 4,294,115 | 10/1981 | Labus | 374/172 |
| 4,816,748 | 3/1989 | Tazawa et al. | 374/183 |
| 5,096,303 | 3/1992 | Jeziorowski | 374/183 |
| 5,317,520 | 5/1994 | Castle | 374/183 |

FOREIGN PATENT DOCUMENTS 1160030  7/1986  Japan ................... 374/183

*Primary Examiner*—Diego F. F. Gutierrez
*Attorney, Agent, or Firm*—Anderson Kill Olick & Oshinsky

[57] ABSTRACT

A temperature sensor arrangement including a temperature sensor having a measuring element formed as a temperature-dependent variable resistor, and an electronic circuit for function checking of the temperature sensor. The electronic circuit includes a temperature-independent test resistor arranged parallel to the measuring element, first and second semiconductor switches arranged in current circuits of the measuring element and the test resistor, respectively, and a control conductor and a voltage converting element for alternatively connecting the two semiconductor switches to an auxiliary input of the temperature sensor.

7 Claims, 3 Drawing Sheets

ARRANGEMENT FOR FUNCTION CHECKING OF A TEMPERATURE SENSOR

BACKGROUND OF THE INVENTION

The present invention relates to an arrangement for function checking of temperature sensors, which are used for maintaining a required temperature, within relatively close tolerances, in refrigeration vehicles and storage facilities. The temperature sensor includes a measuring element formed as a temperature-dependant variable resistor, and an electronic circuit for signal processional and frequency conversion.

It is known that economic as well as health considerations require that the temperature of refrigerated and freezed food products should be kept within relatively close tolerances along the distribution chain of the products from producers to consumers. For a responsible transportation contractor and a storage facility manager it is important to be able to document the compliance with the refrigeration requirements and, in case of a damage, to be able to furnish the insurer with a record showing that there was no absence of due care or willful disregard in maintaining necessary temperatures of the transporting stuff and/or there was no improper handling of the refrigeration equipment.

This means that it is necessary not only to be able to measure the storage, in particular, transportation temperature, but also to be able to continuously record them, with a plausibility of the recording being able to be confirmed by a neutral authority, e.g., Bureau of Standards. In other words, the temperature recording devices need be equipped with means capable to register functioning errors by random or automatic regular testing or to confirm proper functioning of the refrigeration equipment. In the later case, it should be able to produce a record indicating that no error or changes have taken place, but that rather, in case of damage, the refrigeration equipment was not adjusted to the required refrigerating temperature, which might have been made deliberately in order to save fuel. The simple way to effect such function checking is to check a temperature sensor of a temperature recording system which may include a temperature sensor, a recording device, an indication device and/or an output device. Generally, the temperature sensors, which register the temperature, e.g., in different areas of a refrigerator vehicle, are the critical elements of the system. The arrangement of the temperature sensors in locations, which are often not easily accessible and are obstructed by the product, and the necessity to hermetically seal the inputs and outputs of the temperature sensors, require a remote inquiry such that it would permit to effect checking of temperature sensor with a control device of a recording apparatus of a respective temperature recording system.

Accordingly, the object of the invention is to provide an arrangement which will permit a reliable remote function checking of a temperature sensor with minimum additional costs.

SUMMARY OF THE INVENTION

This and other objects of the present invention, which will become apparent herein after, are achieved by providing an arrangement for function checking of a temperature sensor, which includes a temperature-independent test resistor arranged parallel to the measuring element of the temperature sensor, two semiconductor switches arranged in current circuits of the measuring element and the test resistor, an auxiliary input provided on the temperature sensor, and a control conductor and voltage converting means for alternatively connecting the semiconductor switches to the auxiliary input of the temperature sensor. The function checking of the temperature sensor is effected by providing a frequency, which corresponds to the test resistor, at the measurement output of the temperature sensor.

A particular advantage of the present invention consists in that the function checking of temperature sensor is effected with a complimentary circuit provided in the temperature sensor. Further, the function checking can be effected at any time randomly and at conventional operational temperatures or can be effected in accordance with a function checking control program. To this end, it is sufficient to effect measurement of a predetermined frequency in order to establish that the portions of the electrical circuit of the temperature sensor, which are especially sensitive to changes and, therefore, to drifting, function properly. The temperature sensor would be functioning properly when the checking frequency provided by the complimentary checking circuit lies within predetermined tolerance limits corresponding to the originally established allowable deviations. This solution is based on a premise that the precision and the measurement value repeatability of a platinum resistor, which serves as the measurement element of the temperature sensor, generally should not be questioned. Rather, the checking involves only a fraction of a temperature range assigned to such a resistor, which is measured in the considered case. This means that for the envisaged checking method, when only the measurement value processing is checked, only relatively small additional expenses for hardware are involved. The use of the semiconductor switches permits to avoid wear and contact problem and offer, especially in view of the rough environmental conditions, an acceptable switching function. The temperature effect of the semiconductor switches is small due to their low transfer resistance. Therefore, the complimentary circuit permits to establish relatively close tolerances for effecting function checking. In addition, the envisaged function checking require simply some additional power. It is further important that the establishing of close tolerances for proper functioning of a temperature sensor is made possible, primarily, due to the precision of the used hybrid integrated circuit. As is known, the hybrid integrated circuit technique insures a required temperature value repeatability and a reliable, substantially drift-free operation. The quality of the overall circuit is insured by using resistors with a uniform temperature expansion coefficients, with changing by laser adjustments, e.g., of the output frequency, by successive operational steps, of the hybrid integrated circuit, e.g., taking into account the initial dip-immersion painting.

Advantageously, the housing of the temperature sensor is formed without screw connections and has a flat shape, which prevents it from danger of being damaged during loading or unloading of a refrigeration vehicle. The installation and the replacement of the temperature sensor is facilitated by providing a plug-in-socket with a flat plug and connection contact extending parallel to the wall of the vehicle.

BRIEF DESCRIPTION OF THE DRAWINGS

The objects and features of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
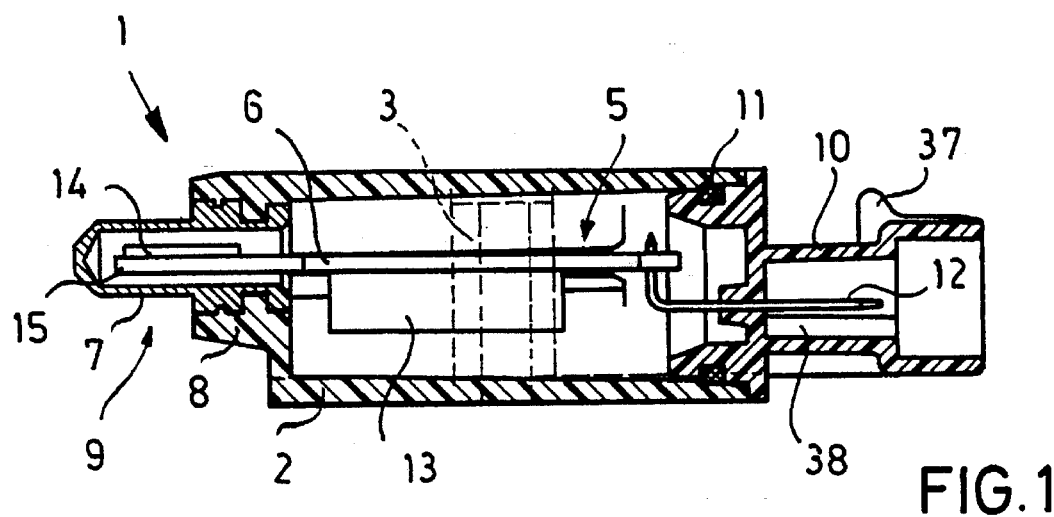
FIG. 1 is a side view of a temperature sensor.
Figure 2:
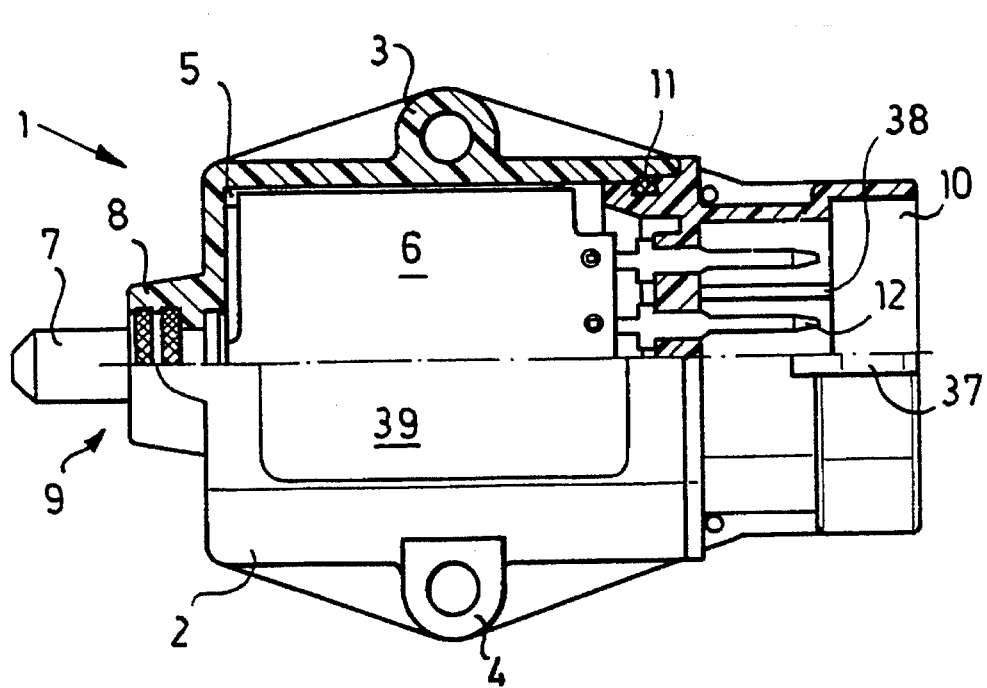
FIG. 2 is a plan view of a temperature sensor.

A temperature sensor 1, which is shown in FIGS. 1 and 2, has a pocket-shaped flat housing 2 provided with lugs 3 and 4 formed integrally therewith for attaching the temperature sensor 1 to a wall of a vehicle. The housing 2, which advantageously is formed of a plastic material, has guides 5 for supporting a printed circuit board 6. The housing 2 includes a pocket-shaped housing part 2a, in which an imbedded casing 7. The printed circuit board 6, the casing 7 is received, and a multi-polar plug-in socket 10. The pocket-shaped housing part 2a and the plug-in socket 10, upon being assembled and glued, for a hermetically sealed housing, and a housing extension 8 form together a measuring head 9 of the temperature sensor 1. The opening of the housing 2 for receiving the plug-in- socket 10 is sealed with O-ring 11. A plurality of contact studs, one of which is designated with a reference numeral 12, are imbedded in the plug-in-socket 10 and are connected to the printed circuit board 6. A hybrid integrated circuit 13 is provided on the printed circuit board 6, e.g., is glued thereto. Additionally, the printed circuit board 6 may be provided with a complementary measuring element 14, e.g., a platinum resistor. To this end, the printed circuit board 6 is provided with a projecting tongue 15, which extends in the casing 7 for supporting the measuring element 14. For insuring a better heat conductance and, simultaneously, for shielding the measuring element 14 from the inner space of the temperature sensor, the casing 7 may be filled with a heat conductive paste.

Figure 3:
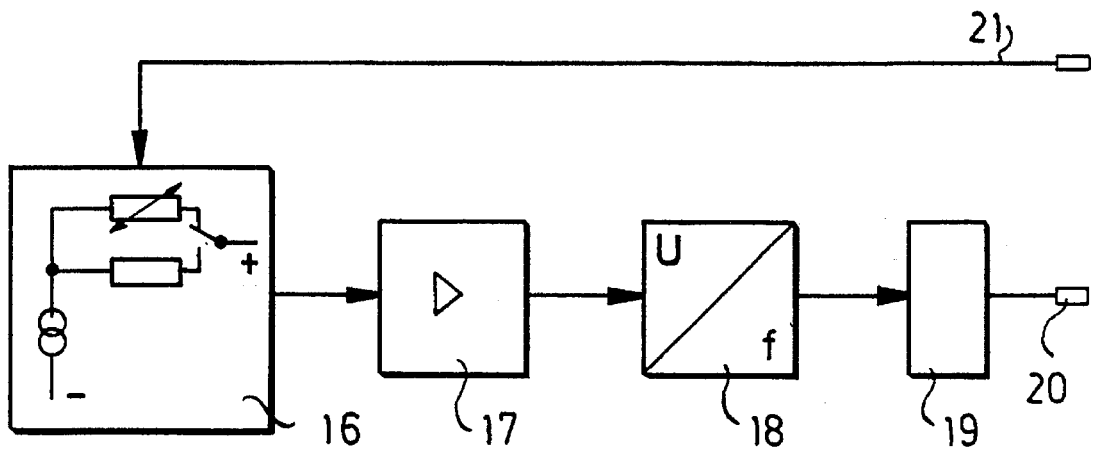
FIG. 3 is block diagram of a temperature sensor.

As it follows from the block diagram of the temperature sensor 1 shown in FIG. 1, which block-diagram is shown in FIG. 3, the measurement transducer 16 of the temperature sensor 1 includes, essentially, a measuring element 14, a constant current transducer 40, a voltage element 41, and resistors 42 for balancing the characteristic curve of the temperature sensor 1. In addition, elements for function checking of the temperature sensor 1 are associated with the measurement transducer 16. The constant current transducer, the measuring element, the test resistor, and a switch are designated in the block diagram with symbolic signs. The signals of the measuring transducer 16, i.e., the temperature signals and the same of the function checking are amplified in an amplifier 17 and are transformed into frequency in a voltage-to-frequency converter 18, and are lined up at intermediate circuit of an output stage 19 at the output 20 of the temperature sensor 1.

Figure 4:
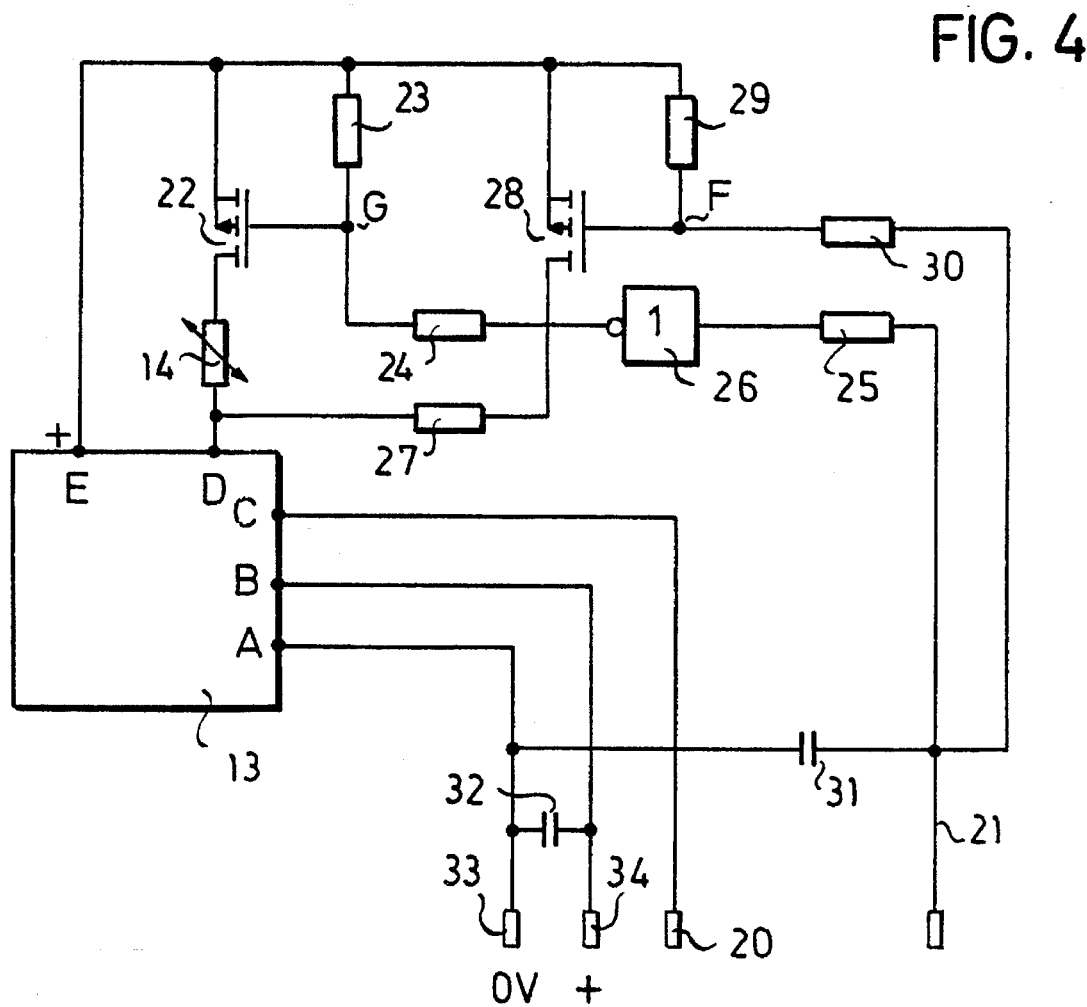
FIG. 4 is a block diagram showing the complementary checking circuit.

The function checking of the temperature sensor 1 is effected via the control conductor 21 which is connected to an auxiliary input 43. FIG. 4 essentially shows an example of wiring-in of the hybrid integrated circuit 13. The current circuit, which is fed from a source of a constant current provided in the integrated circuit 13 and which includes the measuring element 14, further includes a semiconductor switch 22, which is controlled by a circuit including a voltage divider formed of resistors 23, 24 and 25 and a serially connected therewith an inverse functioning circuit element 26. Parallel to the measuring element 14 and the semiconductor switch, there are provided a test resister 27 and a further semiconductor switch 28. Finally, there is provided a voltage divider formed of resistors 29 and 30. The voltage divider formed of the resistors 23, 24, 25 and the voltage divider formed of the resistors 29 and 30 together define voltage converting means which alternatively connects the semiconductor switches 22 and 28 to the control conductor 21 and thereby to an auxiliary input 43. For the use of the temperature sensor, it is very important that the temperature-dependant transfer resistances of the semiconductor switches 22 and 28, respectively, are as small as possible, in order on one hand, not to affect the measuring precision of the measuring element 14 and, on the other hand, to provide relatively close tolerances for function checking. In other words, the measurement and checking changes, which results from the temperature-dependent transfer resistances of the semiconductor switches 22 and 28, should be minimal. Therefore, to this end, there are provided so-called P-channel metal-oxide-field-effect transistors (MOSFETs).

Two interference protection condensators 32 and 31 are connected between the power supply inputs 33 (0 volt) and 34 (e.g. 6–10 volts) and between the control conductor 21 for function checking and the 0-volt input 33, respectively. The power input 34 serves for applying operational voltage to the temperature sensor 1, when it is connected to a detection device (not shown). The contact positions A, B, C, D, E indicate the electrical connections of the hybrid integrated circuit 13 with the complimentary circuit of the printed circuit board 6. The contact positions D and E define a stabilizing voltage, e.g., +5 volts.

Figure 5:
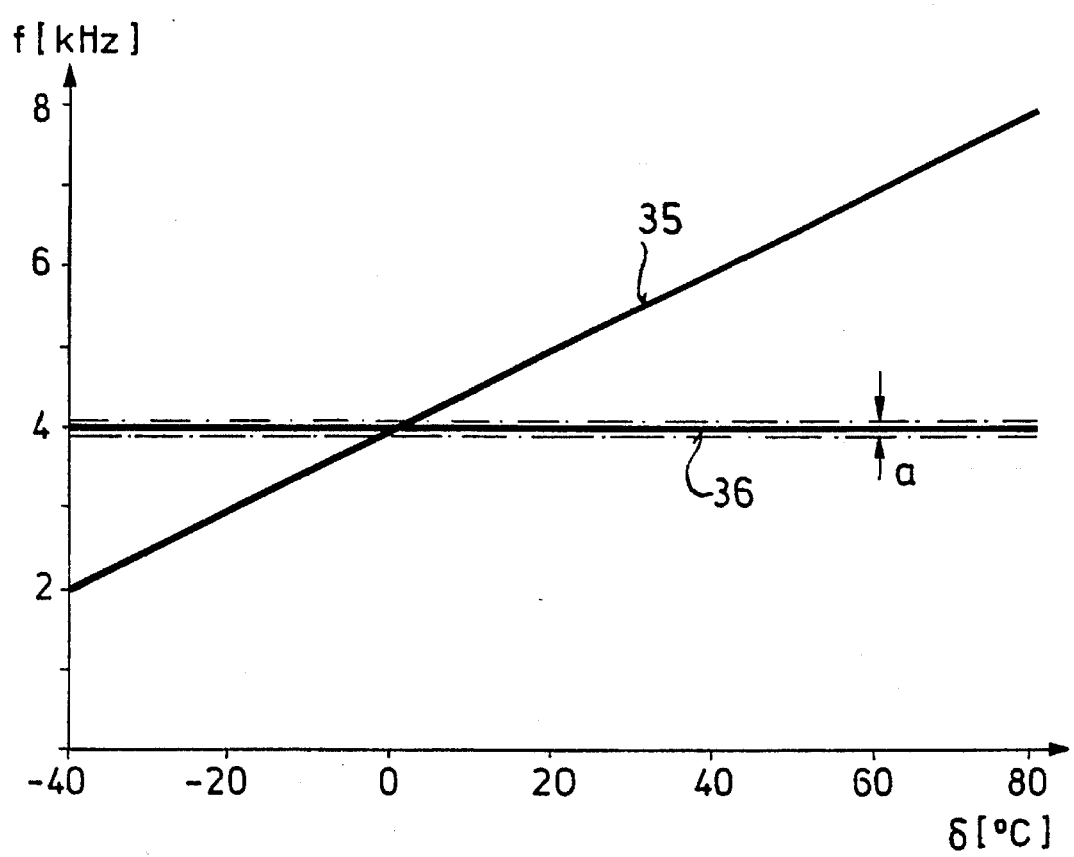
FIG. 5 is frequency-temperature (7/8) diagram.

In the measuring condition of the temperature sensor 1, the semiconductor switch 22 is closed so that the control conductor 21 is connected to the auxiliary input 43 which, in the measuring condition, has a positive potential, and a frequency, which corresponds to the instantaneously dominated temperature, appears at the output 20. It changes with a change in the temperature proportionally, as it is shown by the characteristic line 35 in FIG. 5. In the measuring condition, the semiconductor switch 28 remains open.

When the function checking of the temperature sensor is conducted, the potential of the auxiliary input 43 is switched to 0 volt so that the control conductor 21 is connected to 0 volt. The resulting voltage drop at point F causes closing of the semiconductor switch 28 while the semiconductor switch 22 opens. Simultaneously, the inverse functioning voltage divider 26 causes increase of voltage at point G, which results in opening of the semiconductor switch 22. In this operational condition of the temperature sensor, the test resistor 27, which has a temperature-independent resistance, establishes an output frequency of, e.g., 4 kHz (characteristic line 36 in FIG. 5) which is measured. This frequency should lie within a relatively close tolerance region, for the contemplated case, of +100 Hz which corresponds to proper functioning of the temperature sensor 1. If the measured frequency is outside of the tolerance region, a signal is generated which indicates that the temperature sensor should be replaced.

The function checking is advantageously program-controlled by measuring and recording means, e.g., in hour or day cycles. However, the function checking can be conducted randomly, with an external frequency measuring apparatus, by a control officer of a Bureau of Standard or during border crossing.

For completeness, it should be mentioned that dividing the circuit in a hybrid integrated circuit and a complimentary circuit provides an advantage, when the function checking is not necessary, of eliminating of the complimentary circuit, which permits to reduce the costs of a temperature sensor. It also should be mentioned that the flat plug of the plug-in-socket 10 should, advantageously, so be formed that it seals the contact space of the plug-in-socket 10 from outside. The plug-in-socket 10 has a nose-like projection 37 which, together with a suitable locking bar provided on the flat plug, serves for stopping the plug-in-socket 10, while a web 38 formed on the plug-in-socket 10, together with a groove formed in the flat plug, provides for a reliable replaceable plug-in connection. The temperature sensor 1 is further provided with a nameplate 39.

While the present invention was shown and described with reference to a preferred embodiment, various modification thereof will be apparent to those skilled in the art, and it is not intended that the invention be limited to the disclosed embodiment or details thereof, and departures can be made therefrom within the spirit and scope of the appended claims.

What is claimed is:

1. An arrangement for function checking of a temperature sensor having a measuring element, which is formed as a temperature-dependent variable resistor, an electronic circuit for signal processing and frequency transformation, and a measurement output, said arrangement comprising:

a temperature-independent test resistor arranged parallel to the measuring element of the temperature sensor;

first and second semiconductor switches arranged in current circuits of the measuring element and said test resistor, respectively;

an auxiliary input to be provided in the electronic circuit of the temperature sensor; and a control conductor and voltage converting means for alternatively connecting said semiconductor switches to said auxiliary input, wherein, in a control checking condition of the temperature sensor, a frequency corresponding to said test resistor is provided at the measurement output of the temperature sensor.

2. An arrangement according to claim 1, wherein said semiconductor switches each comprises a P-channel metal-oxide-field effect transducer, and wherein said voltage converting means comprises first and second voltage dividers for controlling said first and second semiconductor switches, respectively.

3. An arrangement according to claim 1, wherein the temperature sensor comprises a printed circuit board, and the electronic circuit for signal processing and frequency conversion of the temperature sensor is formed as a hybrid integrated circuit carried by the printed circuit board, and wherein said arrangement is formed as a complimentary circuit provided on the printed circuit board.

4. A temperature sensor arrangement, comprising:

a temperature sensor including a measuring element formed as a temperature-dependent variable resistance, an electronic circuit for signal processing and frequency transformation, and a measurement output; and means for function checking of said temperature sensor, said function checking means comprising:

a temperature-independent test resistor arranged parallel to said measuring element of said temperature sensor;

first and second semiconductor switches arranged in current circuits of said measuring element and said test resistor, respectively;

an auxiliary input provided in said electronic circuit of said temperature sensor; and a control conductor and voltage converting means for alternatively connecting said semiconductor switches to said auxiliary input of said temperature sensor, wherein, in a control checking condition of said temperature sensor, a frequency corresponding to said test resistor is provided at said measurement output of said temperature sensor.

5. An arrangement according to claim 4, wherein said semiconductor switches each comprises a P-channel metal-oxide-field effect transducer, and wherein said voltage converting means further comprises first and second voltage dividers for controlling said first and second semiconductor switches, respectively.

6. An arrangement according to claim 4, wherein the temperature sensor comprises a printed circuit board and said electronic circuit for signal processing and frequency conversion of said temperature sensor is formed as a hybrid integrated circuit carried by said printed circuit board, and wherein said frequency checking means is formed as a complimentary circuit provided on said printed circuit board.

7. An arrangement according to claim 4, wherein said temperature sensor has a housing including a pocket-shaped part and a multi-polar socket, and a heat conducting casing imbedded in said pocket-shaped part, said pocket-shaped part and said socket, upon being assembled and glued, forming a hermetically sealed housing.

* * * * *